United States Patent [19]

Hartung et al.

[11] E Patent Number: Re. 31,987

[45] Reissued Date of Patent: Sep. 17, 1985

[54] AUTOMATIC LAMP BULB CHANGER FOR SIGNAL LAMPS

[75] Inventors: Russell M. Hartung, Webster; Larry Appleman, Rochester; Warren R. Alexander, Pittsford, all of N.Y.

[73] Assignee: General Signal Corporation, Stamford, Conn.

[21] Appl. No.: 594,886

[22] Filed: Mar. 22, 1984

Related U.S. Patent Documents

Reissue of:

[64] Patent No.: 4,402,038
Issued: Aug. 30, 1983
Appl. No.: 455,079
Filed: Jan. 3, 1983

[51] Int. Cl.[4] ..... F21V 19/04

[52] U.S. Cl. ..... 362/20; 362/232; 362/244; 362/246; 362/250; 362/254; 362/285; 362/276

[58] Field of Search ..... 362/20, 232, 244, 246, 362/250, 254, 285, 276

[56] References Cited

U.S. PATENT DOCUMENTS

| | | | |
|---|---|---|---|
| 1,210,027 | 12/1916 | Wilbur | 362/20 |
| 3,964,040 | 6/1976 | Behl | 362/20 |
| 4,190,777 | 2/1980 | Luce et al. | 362/20 |
| 4,415,951 | 11/1983 | Recane et al. | 362/20 |

*Primary Examiner*—Magdalen Y. C. Moy
*Attorney, Agent, or Firm*—Martin LuKacher

[57] ABSTRACT

In order to provide for automatic replacement of lamp bulbs (lamps) when they fail to illuminate and to enhance the reliability of signal lamps, such as those which signal oncoming trains as they move along railway tracks, a plurality of lamps are disposed angularly spaced from each other on one side of a turntable which is rotatable under spring bias to bring the lamps successively into positions in alignment with the lens of the signal lamp. A latching mechanism having a latch member incorporated into the turntable and a detent member operated by a solenoid provides for releasable engagement of the turntable so as to enable it to move between the successive positions. The primary one of the lamps is wired directly into the signaling system while the secondary lamp or lamps is wired to be operated by a circuit responsive to the illumination of the lamp which is in alignment with the lens and which controls actuation of the solenoid and release of the turntable as well as switching of power to the secondary lamp or lamps.

11 Claims, 9 Drawing Figures

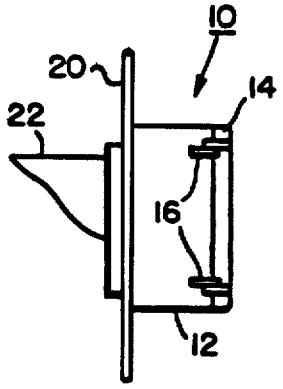
FIG. 1
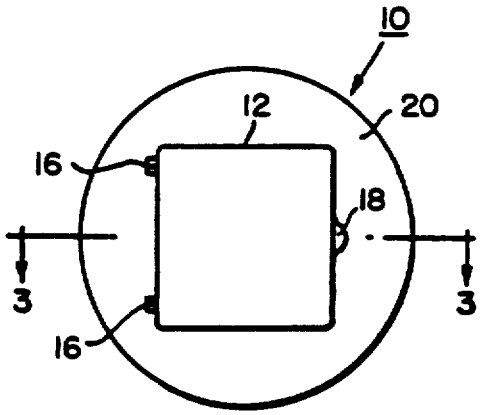
FIG. 2
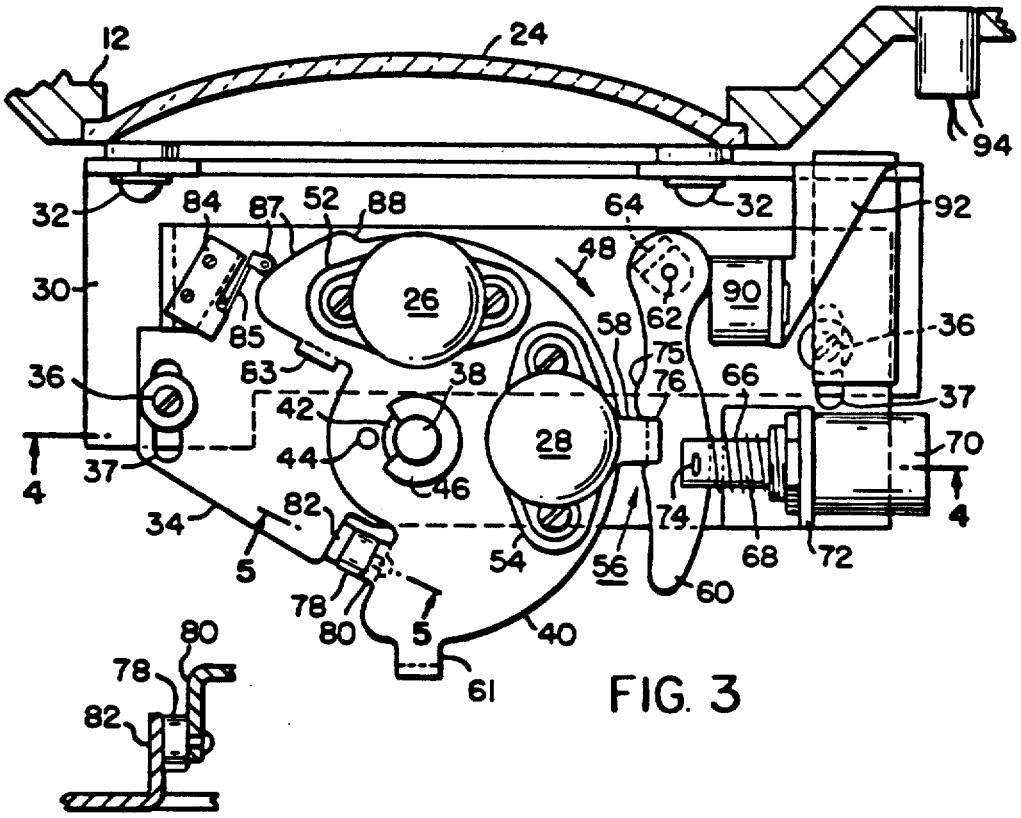
FIG. 3
FIG. 5

AUTOMATIC LAMP BULB CHANGER FOR SIGNAL LAMPS

Matter enclosed in heavy brackets [ ] appears in the original patent but forms no part of this reissue specification; matter printed in italics indicates the additions made by reissue.

DESCRIPTION

The present invention relates to signal lamps and particularly to an automatic lamp changer for use in signal lamps which automatically detects and replaces a failed lamp.

The invention is especially suitable for use in railway signaling or warning lamps which guard and signal trains entering sections of track. The invention may also be used in other signal lamp applications where automatic replacement of failed lamps is desired.

For railroad and other applications, a failed signal lamp can increase significantly the cost of railroad operations. In addition to the direct costs of dispatching maintenance personnel to a possibly remote location, are the costs of train delays. This is because standard rules of railroad operation require the engineer to treat a dark signal as a "stop" indication. It is desirable to avoid to as large an extent as possible, the delay in train movement. It is also desirable to increase the reliability of signaling in railroad and other applications, especially at night where a signal lamp might be missed.

It is a principal object of this invention to provide improved apparatus for use in signal lamps which quickly replaces a failed lamp with a new lamp automatically and reliably.

It is a further object of the invention to provide an improved mechanism for changing lamps which is low in cost and may readily be incorporated in the housing of signal lamps, especially signal lamps used for railroads.

It is another object of the present invention to provide an automatic failed lamp detection and replacement apparatus which provides an indication that the signal is operating on a replacement lamp so as to facilitate maintenance operations.

Briefly described, the invention may be used in a signal lamp having a housing with a lens in one side thereof. The automatic lamp bulb changer provided by the invention uses a turntable having an axis about which it is rotatable. The turntable is mounted in the housing with one side on the turntable approximately parallel to and spaced from the axis of the lens. At least a pair of sockets for receiving primary and secondary lamp bulbs (lamps) are disposed on one side of the turntable so that the lamps reach the optical axis of the lens when installed and the turntable rotated to bring them into alignment with the lens. The sockets are disposed at different angularly spaced radii extending from the axis of the turntable. Spring means biases the turntable to rotate on its axis. Preferably the spring means is a coil spring wound around a shaft on which the turntable is rotatable which is wound up and cocked upon lamp replacement when the turntable is turned to reposition the primary lamp in alignment with the lens. A latching mechanism releasably positions the turnable for movement between the different angular positions in which different ones of the lamps are moved into alignment with the lens. The latching mechanism includes at least two latch members which are angularly spaced from each other on the turntable and define the different angular positions for lens-lamp alignment. Detent means are releasably engagable with the latch members. Means are provided for actuating the detent means upon failure of a lamp in at least the socket which houses the primary lamp. Switch means operated by the turntable provide for the making of electrical connections to the secondary lamp or lamps so as to illuminate the secondary lamp or lamps upon movement of the turntable from the position where the primary lamp is in alignment with the lens to the successive positions where the other, secondary lamps move into alignment with the lens.

The foregoing and other objects, features and advantages of the invention will become apparent from a reading of the following description in connection with the accompanying drawings in which:

FIG. 1 is a side view of a railroad signal unit in which an automatic lamp bulb changer embodying the invention is disposed;

FIG. 2 is a rear view of the signal lamp unit shown in FIG. 1;

FIG. 3 is a fragmentary, sectional plan view of the signal unit shown in FIGS. 1 and 2, the section being taken along the line 3—3 of FIG. 2, and the view showing the secondary lamp in alignment with the lens;

FIG. 5 is a fragmentary, sectional view along the line 5—5 in FIG. 3 which illustrates the turntable stop arrangement;

Figure 4:
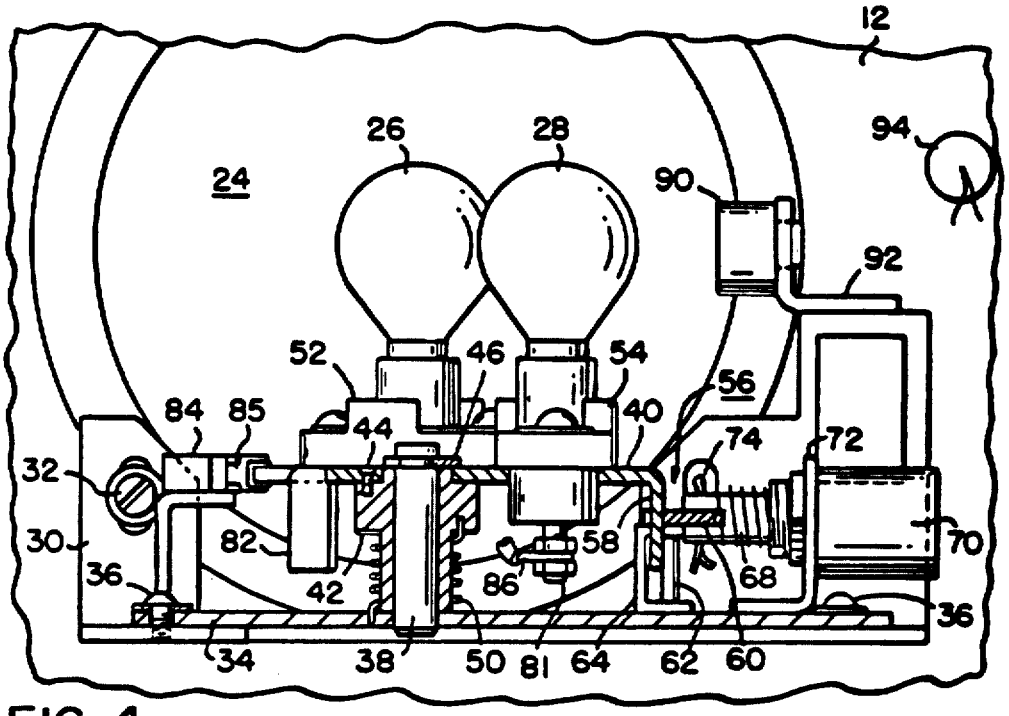
FIG. 4 is a fragmentary sectional view of the signal unit taken along the off-set section line 4—4 in FIG. 3.

Referring first to FIGS. 1 and 2 there is shown a railroad signal light unit 10 having a housing 12 which may be molded of plastic such as foam, polycarbonate or of metal, such as aluminum. The rear of the housing is closed by a door 14 which is mounted on hinges 16 and closed by bolts and/or a lock in an ear 18 to render the housing vandal resistant and accessible only by authorized personnel. A background 20 and hood 22 guards the front of the signal lamp. A plurality of signal lamps each of which projects a different colored signal (red, green or amber) may be stacked one on top of the other in the familiar arrangement, typical of many railroad signals. Other arrangements, triangular for example, may be used.

A lens 24, is mounted in the housing 12 at the front thereof as shown in FIGS. 3 and 4. This lens may be of colored plastic or glass. Illumination is provided by a lamp 26 which is disposed in alignment with the axis of the lens 24. Two lamps 26 and 28 are provided in accordance with this invention. The lamp 28, in alignment with the lens, is the primary lamp and the other lamp 26 is the secondary lamp. The automatic lamp changer apparatus provided by the invention is operative to detect a failure of the primary lamp and to automatically replace it with the secondary lamp by moving the secondary lamp into alignment with the lens 24. The automatic lamp changer apparatus is supported on the front of the housing 12 by an L-shaped bracket plate 30 which is attached thereto by screws 32. The legs of the bracket plate 30 may form an internal acute angle, somewhat less than 90°. A base plate 34 is mounted nearly horizontally on the lower horizontal leg of the bracket 30 by bolts 36 which extend through slots 37 in the base plate 34. The assembly including the lamps 26 and 28 then can be moved along the axis of the lens 24 for focusing purposes. The base plate 34 tilts slightly upwardly to facilitate focusing. A shaft 38 extends upwardly from the base plate 34 and defines a nearly vertical rotational axis for a turntable 40. A stepped sleeve 42 is attached to the turntable 40 by a screw 44. A C-washer 46 in a notch in the shaft 38 holds the turntable 40 assembled in rotational relationship with the sleeve 42 on the shaft 38. The pin 38 is rigidly fastened to the base plate 34. The turntable is biased to rotate in the direction indicated by the arrow 48 by a coil spring 50 having one end attached to the base plate 34 and the other attached to the sleeve 42 which rotates with the turntable 40. The spring 50 is coiled so that it is wound when the turntable is rotated in a counterclockwise direction (opposite to the direction of the arrow 48) such that the spring 50 biases the turntable to rotate in the clockwise direction of the arrow 48 when the turntable is released.

The turntable mounts a pair of sockets 54 and 52 for the primary and secondary lamps, respectively. These sockets are mounted on the side of the turntable facing the axis of the lens 24. By virtue of the sleeve 42 and the height of the shaft 38 the lamps 26 and 28, when disposed in the sockets 52 and 54, are in the plane of the optical axis of the lens 24 and aligned with the lens 24. It will be observed that the sockets and the lamps are angularly spaced from each other along two angularly spaced radii, which in the illustrated embodiment of the invention are 90 degrees apart.

There are two positions angularly spaced 90 degrees apart in the embodiment of the invention illustrated in FIGS. 3 and 4 for the lamps 26 and 28 and their sockets 52 and 54. There are also two angularly spaced positions 90 degrees apart in which the primary lamp 28 and the secondary lamp 26 are disposed in alignment with the lens 24. These positions are defined by a latching mechanism 56 which releasably engages the turntable 40 and enables the turntable to move between these angularly spaced positions to bring the lamps into alignment with the lens 24. These positions are defined by latch members 58 and 61 which are tabs integral with the turntable and extending radially outward and downwardly, from the side thereof on which the lamp sockets 52 and 54 are mounted, below the underside of the turntable 40.

The latch member tabs 58 and 61 are releasably engagable with detent means provided by a lever 60 pivotally mounted on a post 62 on a pivotal axis parallel to the rotational axis of the turntable (the axis of the shaft 38). The post 62 is mounted to the base plate 34. A tab 64, integral with the lever 60, forms an "L" supporting the lever 60, through which the post 62 extends. The detent means also includes a spring 66 which is mounted on the plunger or armature 68 of a solenoid 70. The solenoid 70 is mounted on a bracket 72 extending upwardly from the base plate 34. A cotter pin 74 connects the lever 60 to the solenoid armature 68.

A notch 76 in the lever 60 receives the latch member tab 58 or the latch member tab 6. When the lamp bulbs 26 and 28 are installed in their sockets 52 and 54, or when the primary bulb 28 is changed, after the secondary bulb has moved into position in alignment with the lens, replacing the primary bulb, the turntable is rotated in a counterclockwise direction by hand winding the spring 50 until the latch member tab 61 enters the notch 76 in the detent lever 60. Upon detection of a failure of the primary lamp the solenoid is actuated and pulls in. This releases the latch mechanism such that the tab 61 moves out of the notch 76. The other tab 58 90 degrees apart then cams over the leading edge 75 of the lever 60 and drops into the notch 76 to engage and hold the turntable. Since the angular position of the latch member tab 61 defines the position in which the secondary lamp 28 is in alignment with the lens 24, the secondary lamp is then positioned in alignment with the lens 24.

The movement of the turntable between these positions where the lamps 26 and 28 are in alignment with the lens 24 is cushioned by a stop mechanism which is shown in FIG. 5, as well as in FIG. 3, and in part in FIG. 4. This stop mechanism includes an elastomeric, preferably soft energy absorbing rubber button 78, attached on a tab 80 of the turntable 40. A tab 82 extending upwardly from the base plate 34 engages the button 78 when the turntable moves to the position where the latch member tab 58 enters the notch 76 in the lever 60 and the secondary lamp 26 is in alignment with the lens 24. The button 78, thus, absorbs any vibration and reduces any possibility that the latch member tab 58 will move out of the notch 76 unless the lever 60 is positively pulled back so as to release the latch member tab 58. The upstanding part of the tab 82 also acts as a stop against another tab 83 on the turntable 40 to assure that the primary lamp 28 is disposed in alignment with the lens 24 when the turntable is moved in the counterclockwise direction to wind the spring 50. Of course, the lever 60 is pulled back, preferably by hand to release the latch member tab 58, so as to permit the turntable to be revolved until the tab 32 thereon meets the upstanding end of the tab 82 on the base plate 34.

Electrical connections to the sockets are provided by terminals and wiring, one of such terminals 81 and a wire 86 therein is shown by way of example in FIG. 4. As will be explained in connection with FIG. 9, the primary lamp 28 is continuously connected to the power source, either AC or DC voltage, which controls the signal lamp 10. Operating voltage is applied to the secondary lamp by way of a single pole double throw switch 84. The actuator of this switch rides on a cam surface defined by the edge 86 of the turntable 40. Upon partial movement of the turntable between the positions where the primary and secondary lamps are in alignment with the lens 24, movement of the actuator 87 of the switch 84 occurs as the actuator follows the cam surface radially outwardly from the turntable 40. The portion of the cam surface where switch actuation occurs is indicated at 88 in FIG. 3. Then the switch enables the operating voltage to be applied to the secondary lamp. Since the primary lamp has already failed, it matters not that the primary lamp 28 remains connected across the source of operating voltage.

Failure of the primary lamp is detected by a photodetector 90 mounted on a bracket 92. The operation of the circuit which responds to the lack of illumination of the photodetector, which may be a photoresistive photocell, will be explained in connection with FIG. 9.

An indicator lamp 94 on the front of the signal unit 10 is automatically illuminated when the secondary lamp is switched on. A maintenance man or other personnel may observe the illumination of this indicator lamp 94 and know when to service the signal unit 10. Other means such as flags which are visible through any wall of the signal unit, even the back cover, may be used to indicate the failure of the primary lamp.

Figure 6:
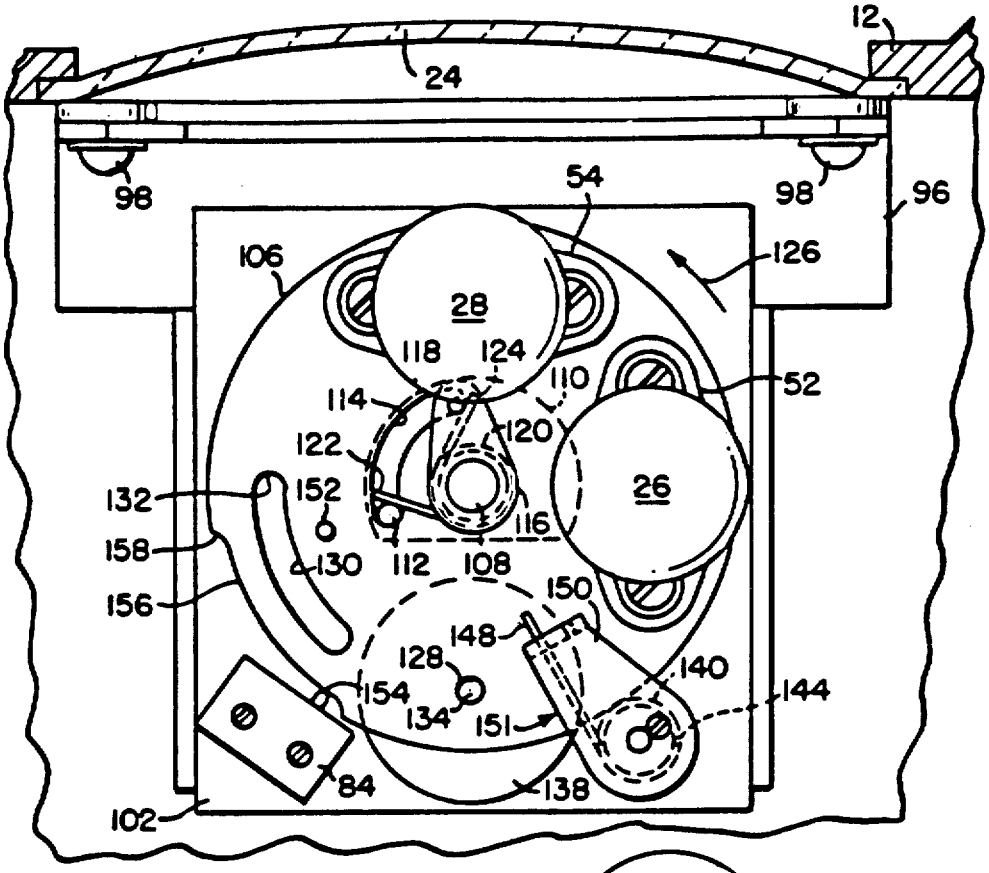
FIG. 6 is a fragmentary, sectional, plan view similar to FIG. 3 illustrating automatic lamp bulb changer apparatus in accordance with another embodiment of the invention and showing the primary lamp in alignment with the lens.
Figure 8:
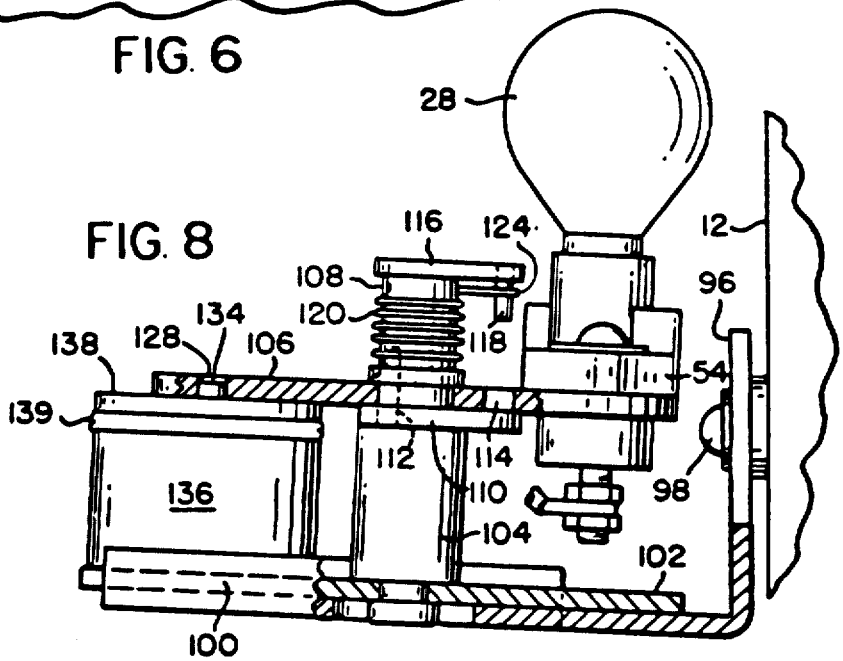
FIG. 8 is a right side view of the apparatus shown in FIGS. 6 and 7, partially broken away.
Figure 7:
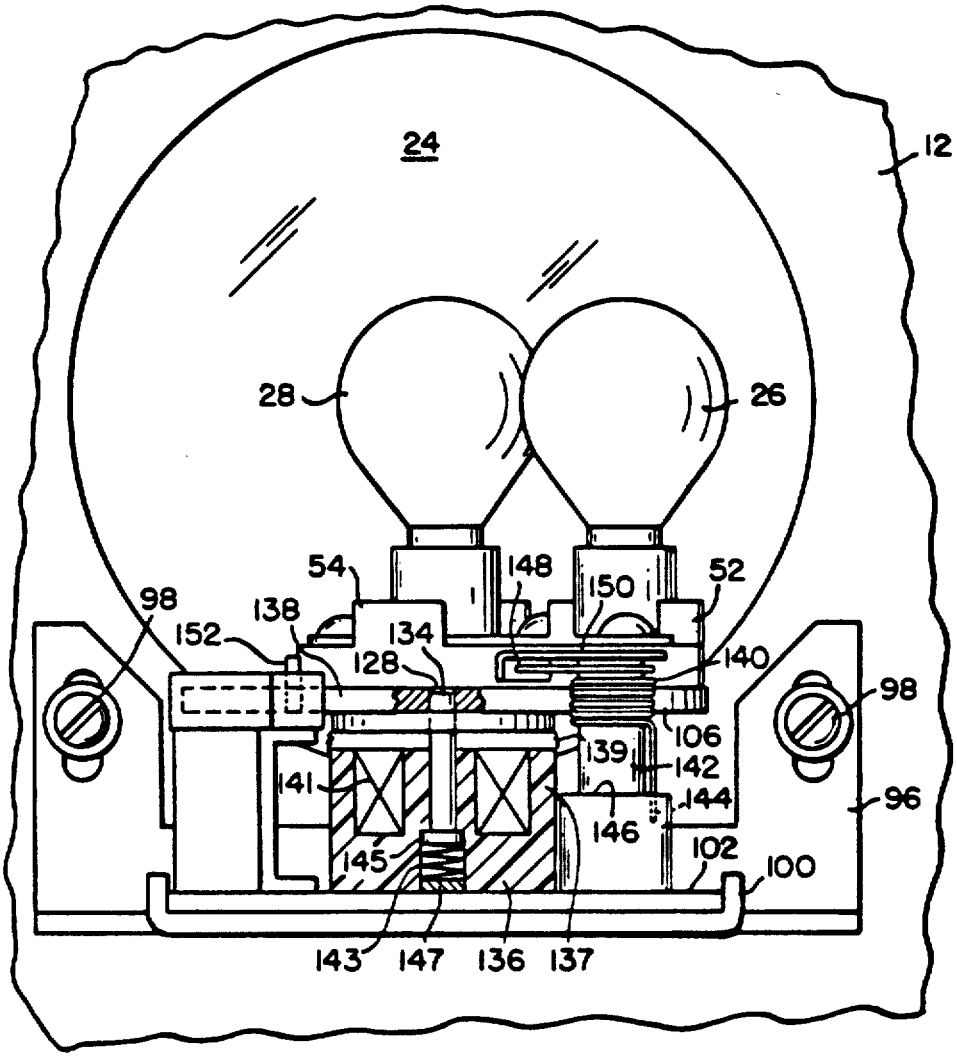
FIG. 7 is a fragmentary view of the apparatus shown in FIG. 6 taken from the rear.

Referring to FIGS. 6, 7 and 8, there is shown another embodiment of the automatic lamp changer apparatus provided by the invention, also for positioning a primary lamp 28 in its socket 52 in alignment with the lens 24 of the signal lamp unit 10 and replacing the primary lamp 28 with a secondary lamp 26 mounted in its socket 54 when the primary lamp 28 fails. The apparatus is mounted in a L-shaped bracket 96 which is held on the front plate of the housing 12 by screws 98. The upwardly extending leg of this bracket 96 is slightly tilted to form an acute angle with the horizontal leg somewhat less than 90 degrees to assist in focusing as was explained in connection with the bracket 30 in FIG. 3. The nearly horizontal leg of the bracket 96 forms a channel 100 which receives a base plate 102. The base plate 102 is moveable in the channel 100 for focusing and may be secured in the channel 100 of the bracket 96 by means of screws, not shown. A hub 104 is attached to the base plate 102. Rotatably mounted inside the hub 104 is a post 108 which is attached to and rotatable with the turntable 106. The post 108 extends upwardly from the turntable 106 and downwardly into the hub 104 and is held therein.

A disc sector 110 which is fixed to the hub 104 underlies the turntable 106. A pin 112, which is held fixed in the disc sector 110, extends upwardly through an arcuate slot 114 in the turntable 110. A flange 116 fixed to the post 108 extends radially therefrom. A pin 118 extends downwardly from the flange 116. A coil spring 120 has opposite ends 122 and 124 respectively extending from the opposite ends of the spring 120 and bearing against the pins 112 and 118. The spring 120 is coiled such that it biases the turntable 106 in the counterclockwise direction indicated by the arrow 126 in FIG. 6. The spring is wound when the turntable is turned in a clockwise direction so as to store energy for biasing the turntable 106 in the counterclockwise direction indicated by the arrow 126.

The lamp bulbs 26 and 28 and their sockets 52 and 54 are disposed on the upper side of the turntable 106 which is mounted in position such as to locate the lamps along the axis of the lens 24 in alignment therewith when the primary lamp 28 is in the position shown in the drawing and when the secondary lamp 26 moves under the bias of the spring 120 to the position shown for the primary lamp. The two lamps and their sockets are disposed along angularly spaced radii 90 degrees apart as was the case for the embodiment of the invention shown in FIGS. 3 to 5.

The positions of the lamps in alignment with the lens 24 are defined by openings 128 and 130 through the turntable 106. The opening 128 is a hole, while the opening 130 is shown as an arcuate slot. The opening 130 may, however, also be a hole. It will be observed that the center of the hole 128 and the center or the radius at the end 132 of the slot 130 furthest from the hole 128 are 90 degrees apart to correspond to the 90 degree angular displacement of the lamps 26 and 28. The hole 128 and slot 130 provide the latch means of a latching mechanism for releasably engaging the turntable 106. This latching mechanism also includes a spring biased detent provided by a post 134 at the end of the armature of a solenoid 136. The armature of the solenoid 136 is reciprocally moveable in the direction of the axis of the shaft 104 (the rotational axis of the turntable), and is spring biased upwardly toward the underside of the turntable 106. The armature of the solenoid 136 is a disc 138 attached to the post 134. A bellows 139 seals the gap between the disc and the cupshaped magnetic structure 137 of the solenoid which contains its coil 141. A spring 143 contained in the structure 137 between an enlarged end 145 of the post 134 and an insert 147 biases the armature and post 134 upwardly. The armature pulls in when the coil 141 has current therein. The disc 138 may be manually engaged to pull down the solenoid and release the post from the hole 130 so as to enable the turntable to be rotated in a counterclockwise direction and set in the position shown in FIGS. 6 to 8 of the drawing. The use of an arcuate slot as the opening 130 may be preferred in order to allow the post 134 to move up into the turntable before the end 132 of the slot reaches its final position where the turntable is stopped by the engagement of a post 152 with a spring stop arrangement 151 such that the secondary lamp 28 is positioned in alignment with the lens 24.

The stop arrangement 151 provides a stop and shock absorber for the turntable 106 when it reaches the position where the secondary lamp 26 is in alignment with the lens 24, another spring 140 is wound around a post 142 which extends upwardly from the base plate 102. One end of the spring 144 is restrained in a step 146 on the post 142. The other end 148 of the spring projects radially inwardly of the turntable 106. This end is guarded by a flange 150 on the top of the post 142. The pin 152 which projects from the upper side of the turntable 106 is disposed to engage the end 148 of the spring 140. The spring 140 thus absorbs the rotational energy of the turntable and brings it to a smooth shock free stop as the turntable reaches the far end 132 of the arcuate slot 130.

Figure 9:
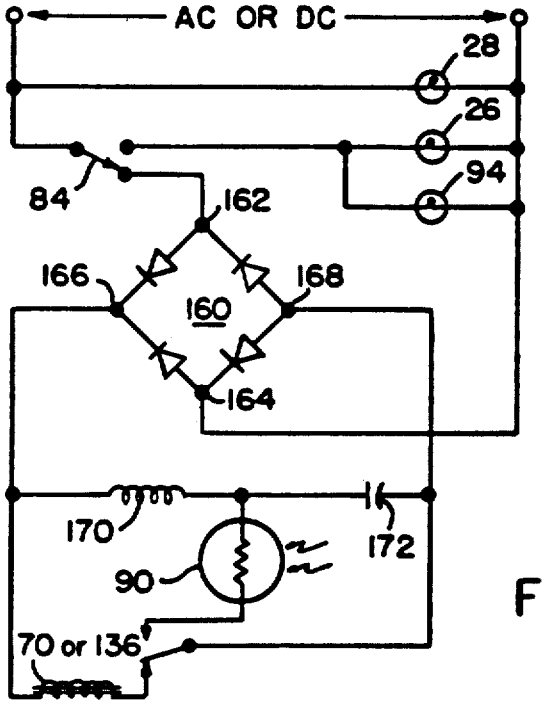
FIG. 9 is a schematic diagram illustrating one embodiment of the circuit components and wiring which can be used in the apparatus illustrated in FIGS. 3 to 5 or 6 through 8.

Operation of the solenoid 136 is provided by means of the circuitry shown in FIG. 9. The switching of operating voltage to the secondary lamp 26 and also to an indicator lamp 94 is provided by means of a single pole double throw switch, such as the switch 84, the actuator 154 of which rides on a cam surface 156 defined by the edge of the turntable 106. Accordingly, as the turntable moves from the position where the primary lamp 28 is in alignment with the lens 24 to the position where the secondary lamp 26 moves into alignment with the lens 24, the actuator 154 moves up a portion 158 of the cam surface 156 and applies operating voltage to the secondary lamp 28.

Referring to FIG. 9 it will be observed that the primary lamp 28 is always connected across the source of operating voltage for the signal unit. This source may be operated by the railroad signaling system which applies voltage when the signal unit is to be actuated. In any event, the primary lamp is always across the source of operating voltage. The secondary lamp 26 paralleled by the indicator lamp 94, is connected across the source through the switch 84. The switch 84 is shown in the position where the primary lamp 28 is in alignment with the lens 24. Then current is applied through a bridge circuit 160 from the supply through the switch 84, since one of the opposite diagonals 162, 164 of the bridge 160 is connected through the switch 84 across the supply. The opposite diagonal 166, 168 of the bridge is connected across a relay operating winding 170 which is in series with a capacitor 172. The relay 170 has single pole double throw switching contacts which are shown in the position where the relay operating winding does not have current passing therethrough and is unoperated. Then the solenoid 70 or 136 is connected through the relay contacts across the diagonal 166, 168 of the bridge 160. A photocell is connected between the junction of the relay operating winding 170 and capacitor 172 and the normally open relay contact (the contact which is broken from the pole of the relay contacts when the relay is unoperated—as shown in FIG. 9).

When the primary lamp 28 is positioned in alignment with the lens and the signal lamp is initially turned on (the AC or DC supply is connected to the circuit), a transient current is generated which passes through the relay operating winding 170 and the capacitor 172 and the diagonal 166, 168 of the bridge 160. This transient is of insufficient duration to operate the solenoid 70 or 136. The transient, however, is of sufficient duration as to cause the relay to pull in by the time the primary lamp reaches illumination. Then the photocell resistance decreases, such that a circuit is provided through the photocell and the normally open contacts of the relay to latch the relay with the solenoid disconnected from the circuit between the diagonal 166, 168 of the bridge 160. If, the primary lamp 28 fails, the resistance of the photocell 90 increases, causing the relay 170 to drop out. Current is then applied to the solenoid 70 or 136. The solenoid then releases the latching mechanism 56; the post 134 moving downwardly out of the hole 128 in the embodiment shown in FIGS. 6 to 8. The turntable is then advanced by the spring 50 or 120 to bring the secondary lamp into position in alignment with the lens 24. The switch 84 is then actuated to disconnect the bridge and the relay 170 and solenoid 70 or 136 circuit. The secondary lamp remains illuminated and the solenoid drops out. The detent is then in a position to engage the turntable when it is reset, after the primary lamp 26 is replaced and the turntable positioned with the primary lamp 26 in alignment with the lens 24.

From the foregoing description it will be apparent that there has been provided an improved signal unit having improved automatically operating lamp changer apparatus. While two embodiments of the lamp changer apparatus have been described, variations and modifications therein, within the scope of the invention, will undoubtedly suggest themselves to those skilled in the art. Accordingly, the foregoing description should be taken as illustrative and not in a limiting sense.

We claim:

1. In a signal lamp having a housing with the lens in one side, an automatic lamp changer which comprises a turntable having an axis about which it rotates, means rotatably mounting said turntable in said housing with one side of said turntable [parallel to] *extending in the direction of* and spaced from the axis of said lens, at least the pair of sockets for receiving lamps which when disposed in said sockets reach the optical axis of said lens, said sockets being disposed along different angularly spaced radii extending from the axis of said turntable, spring means for biasing said turntable to rotate about its axis, a latching mechanism for releasably positioning said turntable for movement between different positions having the same angular spacing as said radii and in which different ones of said lamps are aligned with said lens, said latching mechanism including at least two latch means angularly spaced from each other by said angular spacing on said turntable and defining said different angular positions, detent means releasably engagable with said latch means, and means for actuating said detent means upon failure of a lamp in at least one of said sockets which is in one of said different angular positions in which said last named lamp is positioned in alignment with said lens, and switch means operated by said turntable for making electrical connection to the other of said pair of sockets to illuminate the lamp therein upon movement of said turntable to the next of said angular positions when said lamp in said other of said sockets moves into alignment with said lens.

2. The invention according to claim 1 wherein said means for actuating said detent means includes a solenoid having an armature connected to said detent means.

3. The invention according to claim 2 wherein said detent means is a latching lever having a notch facing the edge of said turntable, said latch means are catch members extending from said edge of said turntable and angularly spaced along said edge to define said different angular positions, and spring means biasing said latching lever towards said edge to releasably receive and hold said catch members in said notch therein until released upon operation of said solenoid.

4. The invention according to claim 3 wherein said catch members are tabs integral with said turntable and extending from said edge away from said one side of said turntable in a direction parallel to the rotational axis thereof, said latching lever having a pivotal axis and being disposed adjacent to said edge of said turntable to interlock with different ones of said tabs and different ones of said angular positions.

5. The invention according to claim 2 wherein said solenoid armature is moveable in the direction of the rotational axis of said turntable, said detent means being disposed adjacent to one of the opposite sides of said turntable and being connected to said armature, said latch means being provided by a plurality of openings in said turntable spaced from each other in accordance with said angularly spaced positions, and said detent means being biased towards said one of said opposite sides of said turntable to enter said openings and releasably engage and hold said turntable in at least one of said angularly spaced positions where a primary one of said lamps is aligned with said lens.

6. The invention according to claim 5 wherein said solenoid is disposed adjacent to the side of said turntable opposite to the side thereof on which said sockets are disposed, said detent means being a post projecting toward said opposite side of said turntable and biased towards said opposite side of said turntable to enter into said openings and move out of said openings when said solenoid is operated to release said turntable.

7. The invention according to claim 1 further comprising a shaft on which said turntable is rotatably mounted for rotation about said axis, said spring means being a coil spring around said shaft and coupled to said turntable, said spring being coiled in a sense to be wound and compressed when said turntable is rotated to a first of said positions and to unwind and drive said turntable toward said second of said positions.

8. The invention as set forth in claim 1 wherein the edge of said turntable has a cam surface engagable with said switch means when said turntable moves to said second position.

9. The invention as set forth in claim 1 wherein said means for actuating said detent means comprises a solenoid, said sockets commprising a first socket for a primary lamp and a second socket for a secondary lamp, power circuits across which said primary lamp socket is connected, circuit means responsive to the absence of illumination from the one of said lamps which is disposed in alignment with said lens for operating said solenoid when power is applied thereto, said switch means being a single pole double throw switch connecting said circuit means across said power circuit when said primary lamp is disposed in alignment with said switch, and connecting said secondary lamp across said power circuit while disconnecting said circuit means therefrom when said secondary lamp is positioned in alignment with said lens.

10. The invention according to claim 9 wherein said circuit means comprises a bridge rectifier circuit having opposite diagonals, one of said diagonals being connected in series with said switch across said power circuit, a relay having an operating winding and single pole double throw contacts different ones of which are open and closed when said relay is operated and unoperated, respectively, said operating winding being connected in series with a capacitor across the other of said diagonals of said bridge, a photodetector responsive to illumination and being connected between one of said contacts which is closed when said relay is operated and the junction of said winding and said capacitor, said solenoid being connected to the one of said contacts of said relay which is closed when said relay is unoperated and to one of the ends of said other diagonal of said bridge, said pole of said relay contacts being connected to the other of the ends of said other diagonal.

11. The invention according to claim 1 further comprising means operated when said turntable moves to bring a replacement lamp into position and alignment with said lens for indicating that at least one of said lamp bulbs on said turret has failed.

* * * * *